(12) United States Patent
Aghadavoodi Jolfaei et al.

(10) Patent No.: US 12,113,869 B2
(45) Date of Patent: Oct. 8, 2024

(54) APPLICATION SERVICE BEHAVIOR MANAGEMENT USING REQUEST CONTEXT

(71) Applicant: SAP SE, Walldorf (DE)

(72) Inventors: Masoud Aghadavoodi Jolfaei, Wiesloch (DE); Frederick Dufour, Heidelberg (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 17/830,752

(22) Filed: Jun. 2, 2022

(65) Prior Publication Data

US 2023/0396687 A1 Dec. 7, 2023

(51) Int. Cl.
*H04L 67/51* (2022.01)
*G06F 16/2455* (2019.01)
*H04L 41/084* (2022.01)
*H04L 67/133* (2022.01)

(52) U.S. Cl.
CPC .......... *H04L 67/51* (2022.05); *G06F 16/2455* (2019.01); *H04L 41/084* (2013.01); *H04L 67/133* (2022.05)

(58) Field of Classification Search
CPC ............ H04L 41/0803; H04L 41/0813; H04L 41/084; H04L 67/10; H04L 67/50; H04L 67/51; H04L 67/60; H04L 67/63; H04L 67/34
See application file for complete search history.

(56) References Cited

U.S. PATENT DOCUMENTS

| | | | |
|---|---|---|---|
| 11,252,025 B2* | 2/2022 | A | H04L 41/0803 |
| 2016/0112475 A1* | 4/2016 | Lawson | H04L 67/51 |
| | | | 709/204 |
| 2018/0285416 A1* | 10/2018 | Bestfleisch | G06F 16/24542 |
| 2018/0302283 A1* | 10/2018 | Vyas | H04L 67/10 |
| 2020/0366752 A1* | 11/2020 | White | H04L 67/63 |
| 2021/0258212 A1* | 8/2021 | Uke | H04L 67/51 |
| 2021/0311756 A1* | 10/2021 | Bhosle | G06F 16/256 |
| 2022/0150113 A1* | 5/2022 | A | H04L 41/0803 |
| 2022/0342718 A1* | 10/2022 | Iqbal | H04L 67/63 |

\* cited by examiner

*Primary Examiner* — Vivek Srivastava
*Assistant Examiner* — William C McBeth
(74) *Attorney, Agent, or Firm* — SCHWEGMAN LUNDBERG & WOESSNER, P.A.

(57) ABSTRACT

Techniques for managing application service behavior using request context are disclosed. In some embodiments, a computer system performs a method comprising: detecting a request sent by a service of an application, the service being one of a plurality of services included in a microservice architecture of the application, the request including a service type data that identifies the application and a service identification data that identifies the service; determining a behavior configuration for the request based on the service type data and the service identification data; and executing the service or another service of the plurality of services based on the determined behavior configuration.

18 Claims, 6 Drawing Sheets

APPLICATION SERVICE BEHAVIOR MANAGEMENT USING REQUEST CONTEXT

BACKGROUND

In a microservice architecture, an application may be arranged as a collection of services.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
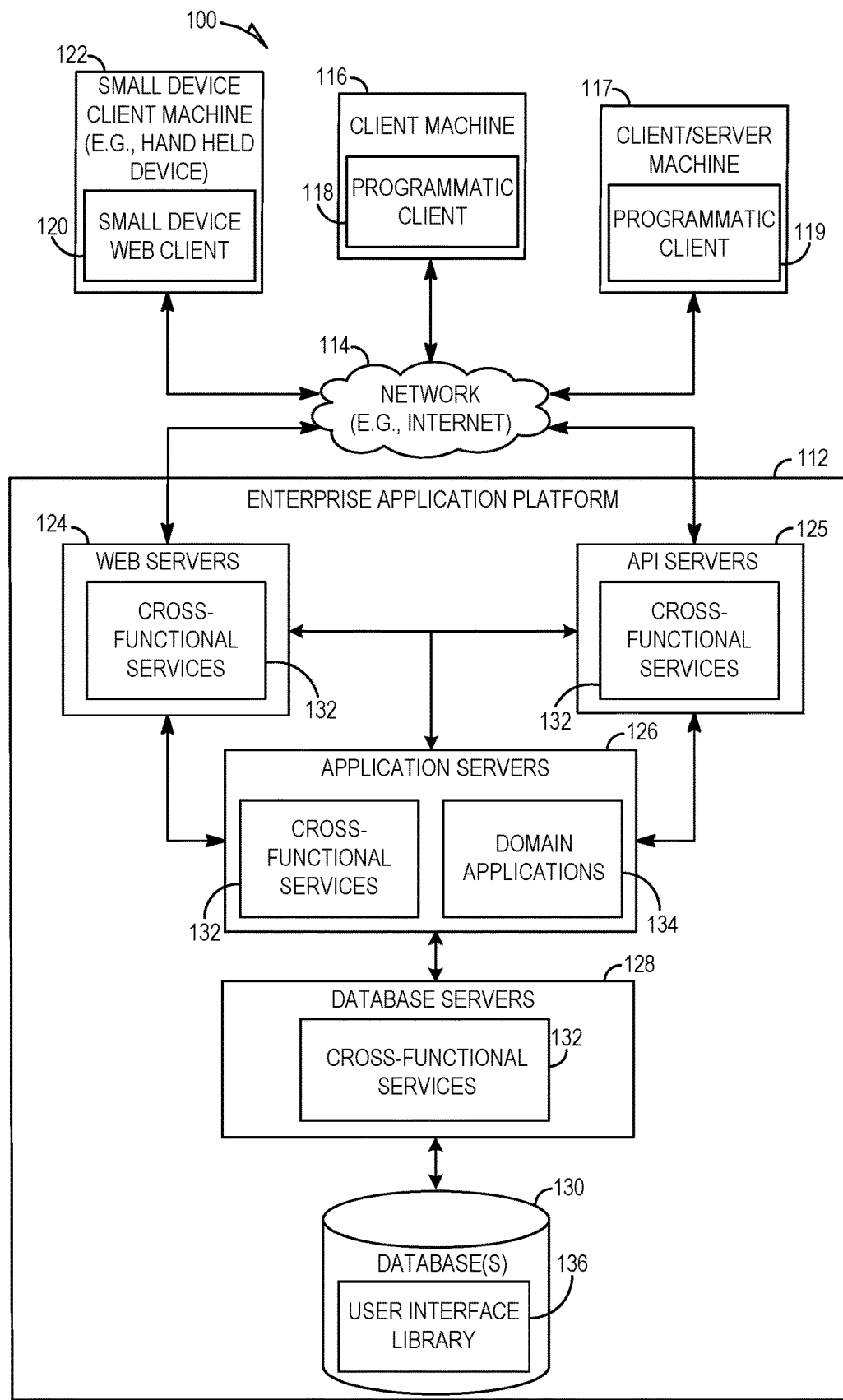
FIG. 1 is an example network diagram illustrating a system.

Example methods and systems for managing application service behavior are disclosed. In the following description, for purposes of explanation, numerous specific details are set forth in order to provide a thorough understanding of example embodiments. It will be evident, however, to one skilled in the art that the present embodiments can be practiced without these specific details.

Microservice architectures and other architectures for software applications may experience resource shortages and overload situations. Current solutions for overcoming resource shortages and overload situations are insufficient, as they only enable static control over the allocation of resources and other application management aspects. For example, current solutions may limit all workloads that originate from a particular application, thereby resulting in certain services of an application being penalized unnecessarily. This static approach fails to dynamically address the specific context of a workload, thereby resulting in inefficient and ineffective management of a software application architecture. As a result, the functioning of the software application architecture and its underlying components suffers. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide dynamic management of application service behavior. In some example embodiments, a computer system detects a request sent by a service of an application, where the service is one of a plurality of services included in a microservice architecture of the application, and the request includes a service type data that identifies the application and a service identification data that identifies the service. The computer system may determine a behavior configuration for the request based on the service type data and the service identification data, and then execute the service or another service of the plurality of services based on the determined behavior configuration. By dynamically determining a behavior configuration for a request sent by the service of the application, the computer system is able to exert fine-grained control over the behavior of the application. As a result, the underlying computer architecture of the application operates more efficiently and effectively. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
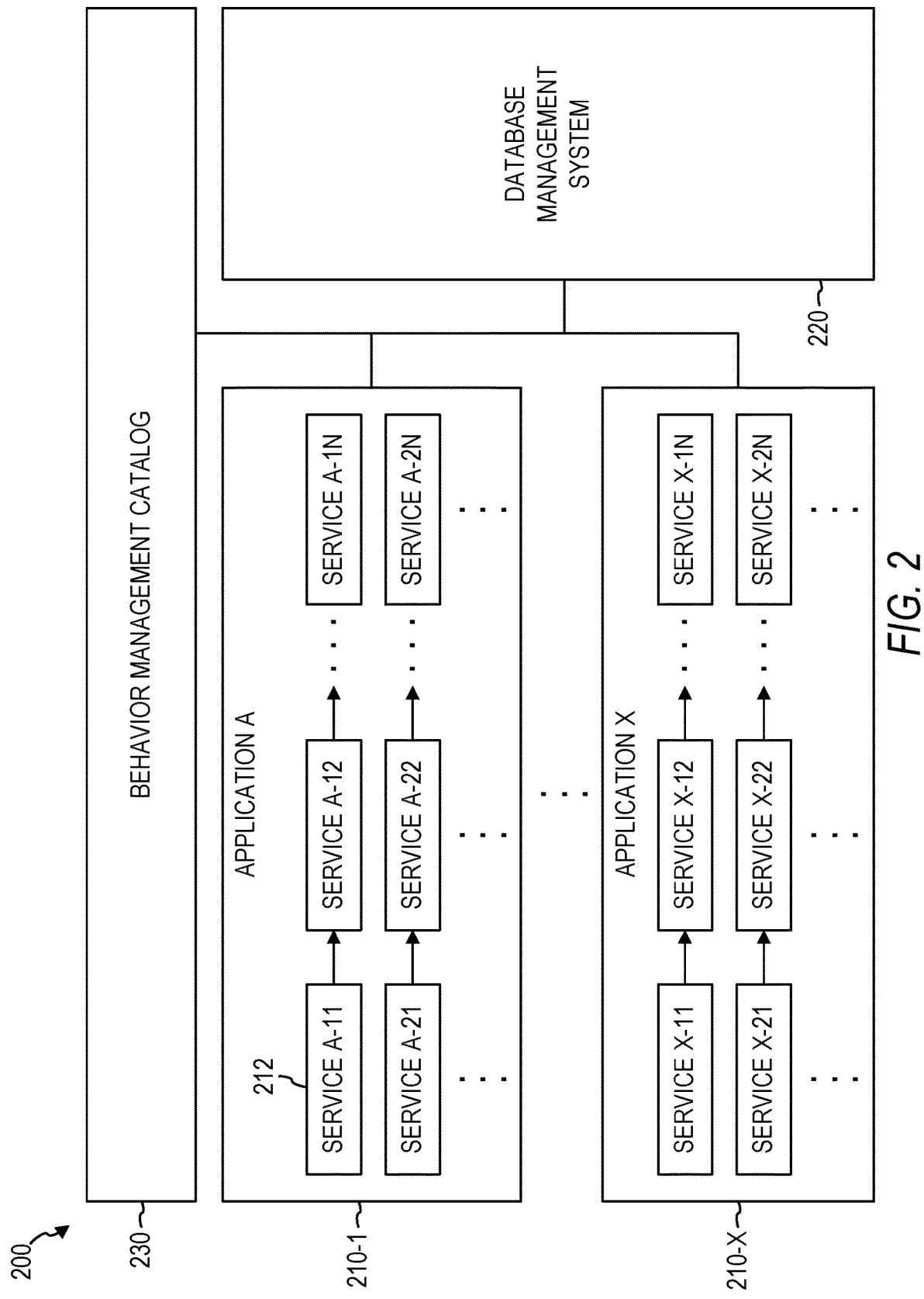
FIG. 2 is a block diagram illustrating an example behavior management system.

FIG. 2 is a block diagram illustrating an example behavior management system 200. In some example embodiments, the behavior management system 200 comprises one or more applications 210 (e.g., applications 210-1 to 210-X in FIG. 2). Each application 210 may comprise a plurality of services 212 arranged in a microservices architecture. Each service 212 of the application 210 may operate as an autonomous component that functions independently of the other services 212 of the application. Each service 212 of the application 210 may communicate with other services 212 of the application 210 or with other services 212 of another application 210. Separate instances of the application 210 may be running at any given time, and these separate instances may follow different execution paths or be at different stages of their respective execution paths. For example, in FIG. 2, a first instance of the application 210-1 (labelled "APPLICATION A" in FIG. 2) may currently be at a stage in its execution path that involves service A-11, while a second instance of the application 210-1 may currently be at a stage in its execution stage that involves service A-2N.

In addition to communicating with other services 212 of the application 210 or with other services 212 of another application 210, each service 212 of the application 210 may communicate with a database management system 220. The database management system 220 may store and retrieve data as requested by the applications 210 (e.g., as requested by the services 212 of the applications 210). The database management system 220 may also be configured to perform advanced analytics and may include extract, transform, load (ETL) capabilities.

In some example embodiments, one or more of the components of the behavior management system 200 may be implemented by the enterprise application platform 112 of FIG. 1. For example, the applications 210 may be incorporated into the application server(s) 126, and the database management system 220 may be incorporated into the application servers 126 or the database servers 128. However, the behavior management system 200 may be implemented in other ways as well.

In some example embodiments, a component of the behavior management system 200 may detect a request sent by a service 212 of an application 210. The component that detects the request may comprise another service 212 in an execution path of the instance of the application 210 (e.g., SERVICE A-11 sends the request and SERVICE A-12 detects the request), another application 210 (e.g., SERVICE A-11 sends the request and SERVICE X-12 detects the request), or the database management system 220. The request may comprise a byte array structure in which values of different properties of the request are encoded. Examples of the different properties of the request may include, but are not limited to, a first eye catcher (e.g., a hard coded value used to determine the beginning of the request), a version of the request format, a length of the byte array structure, trace flags (e.g., flags used to set specific server characteristics or to alter a particular behavior of a server), initial system or component identification (e.g., system and component name that initiated the request), initial service type (e.g., integer value that corresponds to the type of the request), initial user identification (e.g., user name associated with the request), initial action (e.g., string representation of the executed action), initial action type (e.g., integer value that represents the type of executed action), previous component identification (e.g., name od the system or component where the request came from), transaction identification (e.g., unique identifier of the request), client number (e.g., the identification of the client), component type (e.g., the type of the initial component), root context identification (e.g., identifies the initial user session), connection identification (e.g., identifies the communication connection), connection counter (e.g., identifies the number calls per connection), variable part counter (e.g., the number of used variable parts), variable part offset (e.g., an offset to calculate a starting point), optional variable part (e.g., the name of the component specific action type), and second eye catcher (e.g., a hard coded value used to determine an end of the request).

In some example embodiments, the request includes a service type data that identifies the application 210 and a service identification data that identifies the service 212. The component of the behavior management system 200 may determine a behavior configuration for the request based on the service type data and the service identification data. The component of the behavior management system 200 may then execute the service 212 or another service 212 of the plurality of services 212 based on the determined behavior configuration.

The component of the behavior management system 200 may use a behavior management catalog 230 that is stored in a database (e.g., stored in the database 130 of FIG. 1) to determine the behavior configuration. For example, the component of the behavior management system 200 may access the behavior management catalog 230, and then identify the behavior configuration from a plurality of behavior configurations in the behavior management catalog 230 using the service type data and the service identification data. The behavior management catalog 230 may maintain behavior context information that can be used to control or otherwise influence the behavior of one or more components of the behavior management system 200. For example, the behavior context information may be configured to control or otherwise influence the execution behavior of one or more services 212 in the execution path (e.g., SERVICE A-11, SERVICE A-12, . . . , SERVICE A-1N in FIG. 2). In some example embodiments, a combination of the service type data and the service identification data is stored as a key of a key-value pair in the behavior management catalog 230, and the behavior configuration is stored as a value of the key-value pair in the behavior management catalog 230, thereby enabling efficient retrieval of the behavior configuration using the service type data and the service identification data. However, other implementations of behavior management catalog 230 are also within the scope of the present disclosure.

The behavior management catalog 230 may be accessed using a representational state transfer (REST) application programming interface (API), such as via push or pull requests. However, the component of the behavior management system 200 may access the behavior management catalog 230 in other ways as well. The access to the behavior management catalog 230 may be controlled via security roles and also may be subject to life cycle management, such as proper expiration time (e.g., garbage collection) for entries in the behavior management catalog 230.

Figure 3:
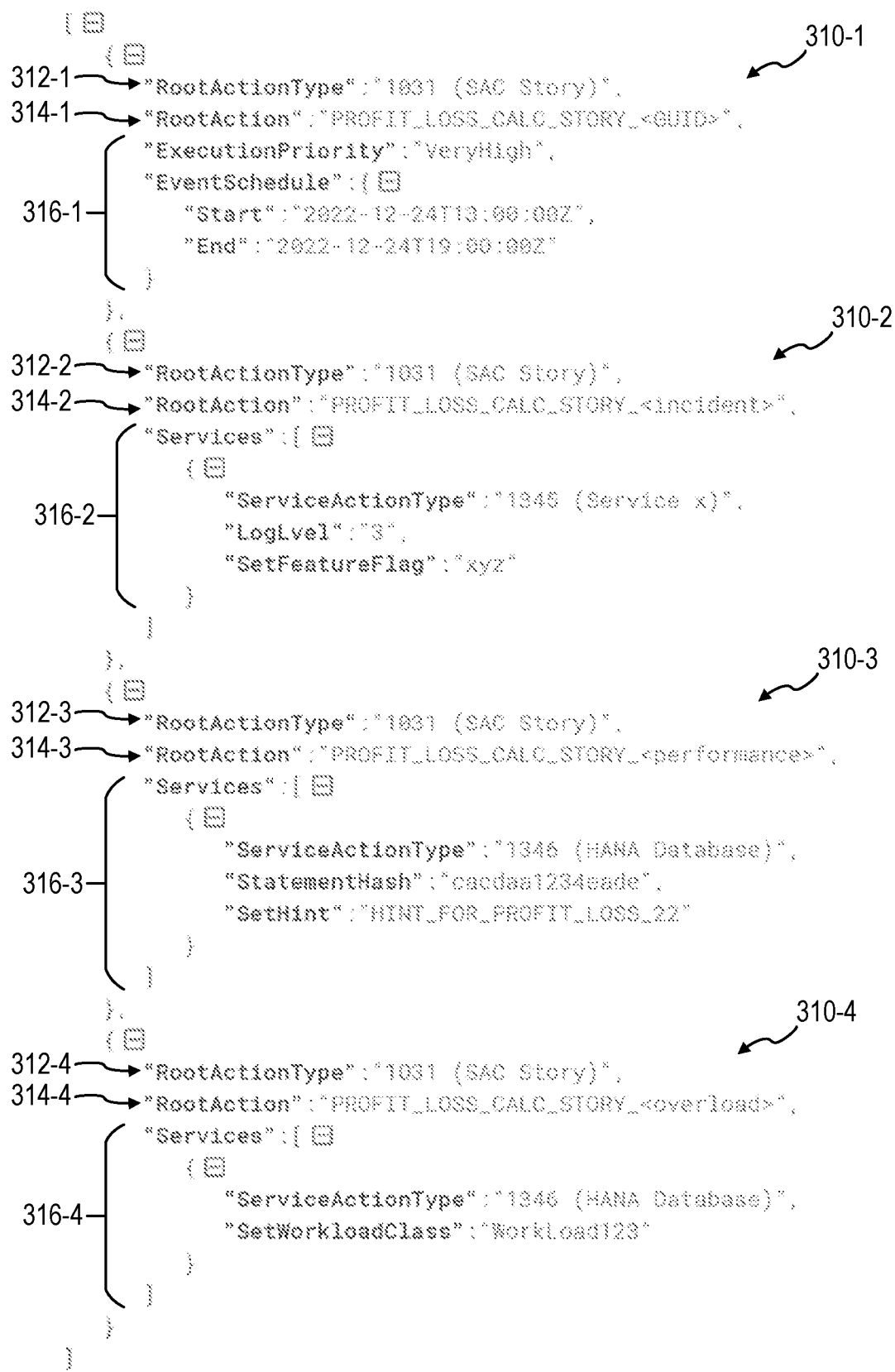
FIG. 3 illustrates example behavior management catalog entries.

FIG. 3 illustrates example behavior management catalog entries 310. Each entry 310 in the behavior management catalog 230 may comprise a service type data 312, a service identification data 314, and a behavior configuration 316. For example, FIG. 3 shows the behavior management catalog 230 comprising entries 310-1, 310-2, 310-3, and 310-4. The entry 310-1 comprises a service type data 312-1, a service identification data 314-1, and a behavior configuration 316-1. The entry 310-2 comprises a service type data 312-2, a service identification data 314-2, and a behavior configuration 316-2. The entry 310-3 comprises a service type data 312-3, a service identification data 314-3, and a behavior configuration 316-3. The entry 310-4 comprises a service type data 312-4, a service identification data 314-4, and a behavior configuration 316-4. The entries 310 may be stored in JavaScript® Object Notation (JSON) format. However, other formats for the entries 310 are also within the scope of the present disclosure.

The behavior configuration 316-1 for the entry 310-1 comprises a configuration of a priority level for the execution of a service 212. In this example, the priority level for the execution of the service 212 is very high, which may be the highest priority level. As a result of this behavior configuration 316-1, all involved services 212 have to ensure that this application 210 (e.g., "1031 (SAC Story)" in FIG. 3) or this service 212 (e.g., "PROFIT_LOSS_CALC_STORY_<GUID>" in FIG. 3) is allocated all of the necessary resources with very high execution priority for the specified scheduled time (e.g., from the indicated start time to the indicated end time).

The behavior configuration 316-2 for the entry 310-2 comprises a configuration of a log level and a feature flag for the executing of the service or the other service. In this example, the accessed service 212 in the process execution flow with a value for "ServiceActionType" of "1345" has to increase its processing log level to 3 (e.g., for incident handling to get more detail information) and also set the feature flag to "xyz" for the execution of that specific service 212 (e.g., for running with different feature settings). The log level describes the type and severity of a logged event. Feature flags (also known as feature toggles or feature switches) are a software development technique that turns certain functionality on and off during runtime, without deploying new code, thereby allowing for better control and more experimentation over the full lifecycle of features.

The behavior configuration 316-3 for the entry 310-3 comprises a configuration for running a database query with a statement hash and a hint. The statement hash may comprise a hash of a query statement of the database query. The hint may be configured to instruct a database engine on how to execute the database query. For example, the hint may instruct the database engine to use or nor to use an index, even if a query optimizer would decide otherwise. In this example, the accessed backend service 212 in the process execution flow with a value for "ServiceActionType" of "1346" will run the database query with the statement hash "cacdaa1234eade" with the hint "HINT_FOR_PROFIT_LOSS_22."

The behavior configuration 316-4 for the entry 310-4 comprises a configuration for the executing of the service 212 or the other service 212 using a workload class identification. The workload class identification may be configured to be used in allocating one or more computing resources for the executing of the service or the other service. In this example, the accessed backend service 212 in the process execution flow with a value for "ServiceActionType" of 1346 will run the executed queries with the workload class identification "WorkLoad123."

Figure 4:
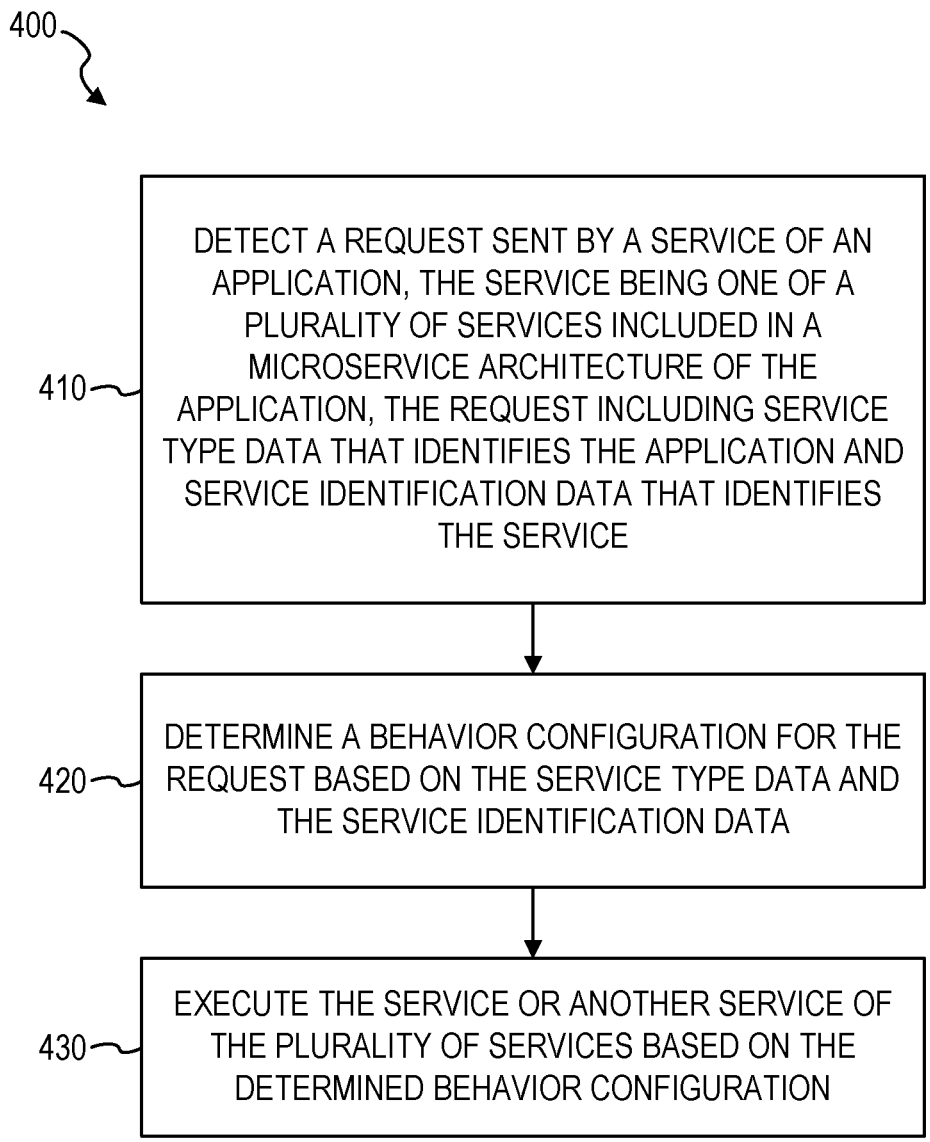
FIG. 4 is a flowchart illustrating an example method of managing application service behavior.

FIG. 4 is a flowchart illustrating an example method 400 of managing application service behavior. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the behavior management system 200 of FIG. 2.

At operation 410, the behavior management system 200 may detect a request sent by a service 212 of an application 210. In some example embodiments, the service 212 is one of a plurality of services 212 included in a microservice architecture of the application 210. The request may include a service type data that identifies the application 210 and a service identification data that identifies the service 212.

Next, the behavior management system 200 may, at operation 420, determine a behavior configuration 316 for the request based on the service type data and the service identification data. In one example, the behavior configuration 316 comprises a configuration of a priority level for the executing of the service or the other service, such as discussed above with respect to the behavior configuration 316-1. In another example, the behavior configuration 316 comprises a configuration of a log level and a feature flag for the executing of the service 212 or the other service 212, such as discusses above with respect to the behavior configuration 316-2. In yet another example, the behavior configuration 316 comprises a configuration for running a database query with a statement hash and a hint, where the statement hash comprises a hash of a query statement of the database query, and the hint is configured to instruct a database engine on how to execute the database query, such as discussed above with respect to the behavior configuration 316-3. In yet another example, the behavior configuration 316 comprises a configuration for the executing of the service 212 or the other service 212 using a workload class identification, where the workload class identification is configured to be used in allocating one or more computing resources for the executing of the service 212 or the other service 212, such as discussed above with respect to the behavior configuration 316-4.

Then, the behavior management system 200 may execute the service 212 or another service 212 of the plurality of services 212 based on the determined behavior configuration 316, at operation 430. For example, the determined behavior configuration 316 may be used to modify the performance of the service 212 or the other service 212, such as discussed above with respect to the examples in FIG. 3.

It is contemplated that any of the other features described within the present disclosure can be incorporated into the method 400.

Figure 5:
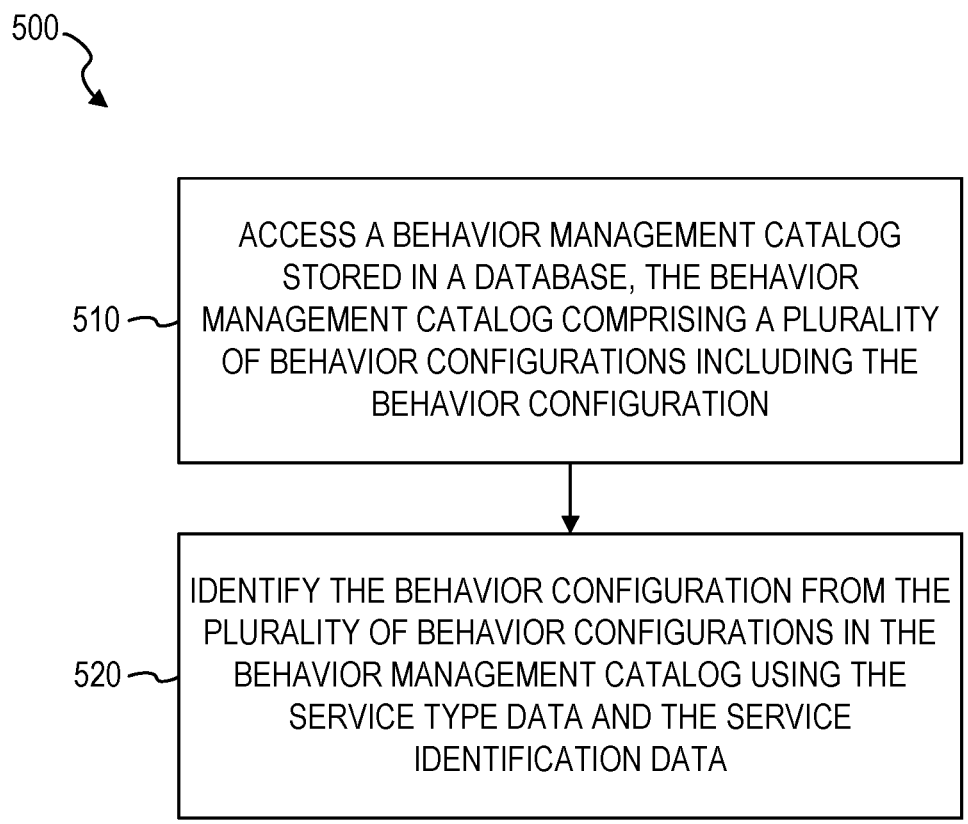
FIG. 5 is a flowchart illustrating an example method of determining a behavior configuration.

FIG. 5 is a flowchart illustrating an example method 500 of determining a behavior configuration. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the behavior management system 200 of FIG. 2. The method 500 may comprise operations 510 and 520, which may be performed as part of operation 420 of the method 400.

At operation 510, the behavior management system 200 may access a behavior management catalog 230 stored in a database. In some example embodiments, the behavior management catalog 230 comprises a plurality of behavior configurations 316 including the behavior configuration 316. The behavior management catalog 230 may be accessed using a representational state transfer (REST) application programming interface (API). The behavior management catalog 230 may be accessed using other types of API's or in other ways as well.

Next, the behavior management system 200 may identify the behavior configuration 316 from the plurality of behavior configurations 316 in the behavior management catalog 230 using the service type data and the service identification data, at operation 520. In some example embodiments, a combination of the service type data and the service identification data is stored as a key of a key-value pair in the behavior management catalog 230, and the behavior configuration 316 is stored as a value of the key-value pair in the behavior management catalog 230.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: detecting a request sent by a service of an application, the service being one of a plurality of services included in a microservice architecture of the application, the request including a service type data that identifies the application and a service identification data that identifies the service; determining a behavior configuration for the request based on the service type data and the service identification data; and executing the service or another service of the plurality of services based on the determined behavior configuration.

Example 2 includes the computer-implemented method of example 1, wherein the determining the behavior configuration comprises: accessing a behavior management catalog stored in a database, the behavior management catalog comprising a plurality of behavior configurations including the behavior configuration; and identifying the behavior configuration from the plurality of behavior configurations in the behavior management catalog using the service type data and the service identification data.

Example 3 includes the computer-implemented method of example 1 or example 2, wherein a combination of the service type data and the service identification data is stored as a key of a key-value pair in the behavior management catalog, and the behavior configuration is stored as a value of the key-value pair in the behavior management catalog.

Example 4 includes the computer-implemented method of any one of examples 1 to 3, wherein the behavior management catalog is accessed using a representational state transfer (REST) application programming interface (API).

Example 5 includes the computer-implemented method of any one of examples 1 to 4, wherein the behavior configuration comprises a configuration of a priority level for the executing of the service or the another service.

Example 6 includes the computer-implemented method of any one of examples 1 to 5, wherein the behavior configuration comprises a configuration of a log level and a feature flag for the executing of the service or the another service.

Example 7 includes the computer-implemented method of any one of examples 1 to 6, wherein the behavior configuration comprises a configuration for running a database query with a statement hash and a hint, the statement hash comprising a hash of a query statement of the database query, and the hint being configured to instruct a database engine on how to execute the database query.

Example 8 includes the computer-implemented method of any one of examples 1 to 7, wherein the behavior configuration comprises a configuration for the executing of the service or the another service using a workload class identification, the workload class identification being configured to be used in allocating one or more computing resources for the executing of the service or the another service.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
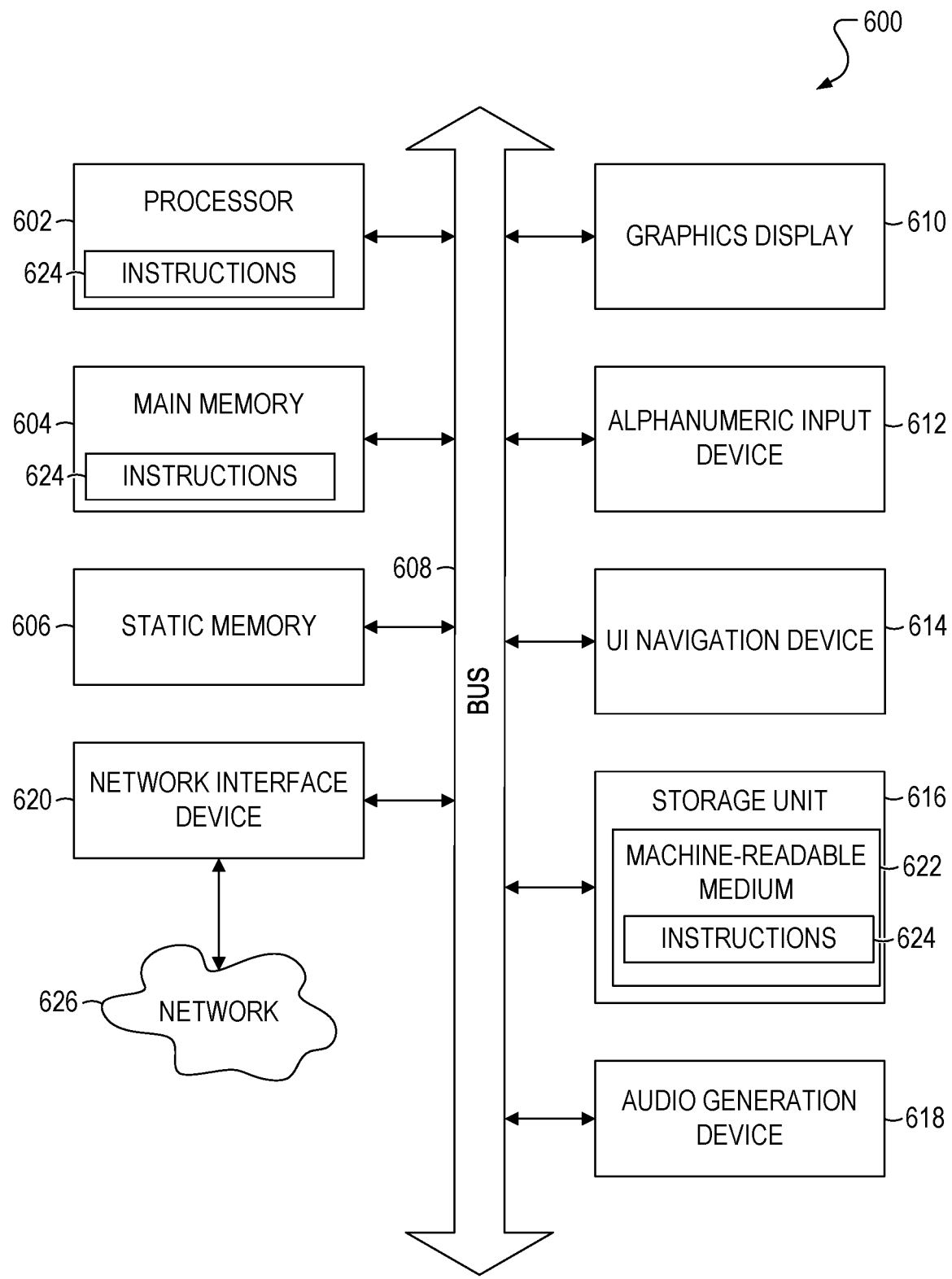
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
    detecting a request sent by a first service of an application, the first service being one of a plurality of services included in a microservice architecture of the application, the request including a service type data that identifies the application and a service identification data that identifies the first service;
    determining a behavior configuration for the request based on the service type data and the service identification data, wherein the determining of the behavior configuration comprises:
        accessing a behavior management catalog stored in a database, the behavior management catalog comprising a plurality of behavior configurations including the behavior configuration, wherein a combination of the service type data and the service identification data is stored as a key of a key-value pair in the behavior management catalog, and the behavior configuration is stored as a value of the key-value pair in the behavior management catalog; and
        identifying the behavior configuration from the plurality of behavior configurations in the behavior management catalog using the service type data and the service identification data; and
    executing a second service of the plurality of services based on the determined behavior configuration, the second service being different from the first service.

2. The computer-implemented method of claim 1, wherein the behavior management catalog is accessed using a representational state transfer (REST) application programming interface (API).

3. The computer-implemented method of claim 1, wherein the behavior configuration comprises a configuration of a priority level for the executing of the service or the another service.

4. The computer-implemented method of claim 1, wherein the behavior configuration comprises a configuration of a log level and a feature flag for the executing of the service or the another service.

5. The computer-implemented method of claim 1, wherein the behavior configuration comprises a configuration for running a database query with a statement hash and a hint, the statement hash comprising a hash of a query statement of the database query, and the hint being configured to instruct a database engine on how to execute the database query.

6. The computer-implemented method of claim 1, wherein the behavior configuration comprises a configuration for the executing of the service or the another service using a workload class identification, the workload class identification being configured to be used in allocating one or more computing resources for the executing of the service or the another service.

7. A system comprising:
    at least one hardware processor; and
    a non-transitory computer-readable medium storing executable instructions that, when executed, cause the at least one hardware processor to perform operations comprising:
        detecting a request sent by a first service of an application, the first service being one of a plurality of services included in a microservice architecture of the application, the request including a service type data that identifies the application and a service identification data that identifies the first service;
        determining a behavior configuration for the request based on the service type data and the service identification data, wherein the determining of the behavior configuration comprises:
            accessing a behavior management catalog stored in a database, the behavior management catalog comprising a plurality of behavior configurations including the behavior configuration, wherein a combination of the service type data and the service identification data is stored as a key of a key-value pair in the behavior management catalog, and the behavior configuration is stored as a value of the key-value pair in the behavior management catalog; and
            identifying the behavior configuration from the plurality of behavior configurations in the behavior management catalog using the service type data and the service identification data; and
        executing a second service of the plurality of services based on the determined behavior configuration, the second service being different from the first service.

8. The system of claim 7, wherein the behavior management catalog is accessed using a representational state transfer (REST) application programming interface (API).

9. The system of claim 7, wherein the behavior configuration comprises a configuration of a priority level for the executing of the service or the another service.

10. The system of claim 7, wherein the behavior configuration comprises a configuration of a log level and a feature flag for the executing of the service or the another service.

11. The system of claim 7, wherein the behavior configuration comprises a configuration for running a database query with a statement hash and a hint, the statement hash comprising a hash of a query statement of the database query, and the hint being configured to instruct a database engine on how to execute the database query.

12. The system of claim 7, wherein the behavior configuration comprises a configuration for the executing of the service or the another service using a workload class identification, the workload class identification being configured to be used in allocating one or more computing resources for the executing of the service or the another service.

13. A non-transitory machine-readable storage medium tangibly embodying a set of instructions that, when executed by at least one hardware processor, causes the at least one processor to perform operations comprising:
   detecting a request sent by a first service of an application, the first service being one of a plurality of services included in a microservice architecture of the application, the request including a service type data that identifies the application and a service identification data that identifies the first service;
   determining a behavior configuration for the request based on the service type data and the service identification data, wherein the determining of the behavior configuration comprises:
      accessing a behavior management catalog stored in a database, the behavior management catalog comprising a plurality of behavior configurations including the behavior configuration, wherein a combination of the service type data and the service identification data is stored as a key of a key-value pair in the behavior management catalog, and the behavior configuration is stored as a value of the key-value pair in the behavior management catalog; and
      identifying the behavior configuration from the plurality of behavior configurations in the behavior management catalog using the service type data and the service identification data; and
   executing a second service of the plurality of services based on the determined behavior configuration, the second service being different from the first service.

14. The non-transitory machine-readable storage medium of claim 13, wherein the behavior management catalog is accessed using a representational state transfer (REST) application programming interface (API).

15. The non-transitory machine-readable storage medium of claim 13, wherein the behavior configuration comprises a configuration of a priority level for the executing of the service or the another service.

16. The non-transitory machine-readable storage medium of claim 13, wherein the behavior configuration comprises a configuration of a log level and a feature flag for the executing of the service or the another service.

17. The non-transitory machine-readable storage medium of claim 13, wherein the behavior configuration comprises a configuration for running a database query with a statement hash and a hint, the statement hash comprising a hash of a query statement of the database query, and the hint being configured to instruct a database engine on how to execute the database query.

18. The non-transitory machine-readable storage medium of claim 13, wherein the behavior configuration comprises a configuration for the executing of the service or the another service using a workload class identification, the workload class identification being configured to be used in allocating one or more computing resources for the executing of the service or the another service.

* * * * *